July 7, 1959     J. LIEBEL     2,893,268
PLANETARY GEAR
Filed April 29, 1957

INVENTOR
JULIUS LIEBEL

BY    *Toulmin & Toulmin*

ATTORNEYS

United States Patent Office 2,893,268
Patented July 7, 1959

2,893,268

PLANETARY GEAR

Julius Liebel, Nurnberg, Germany, assignor to M.A.N. Maschinenfabrik Augsburg-Nuernberg A.G., Nurnberg, Germany Application April 29, 1957, Serial No. 655,651

Claims priority, application Germany May 9, 1956

6 Claims. (Cl. 74—801)

The present invention relates to a planetary gear, more particularly, to a planetary gear between the driving shaft of a vehicle wheel and the vehicle wheel itself, wherein both the sun gear and the planet gears are capable of radial movement to equalize the pressure on the gear teeth.

It is the principal object of this invention to provide a planetary gear having a maximum equalization of pressure on the gear teeth thereof.

It is a further object of this invention to provide a quieter operating and longer lasting planetary gear.

It is another object of this invention to provide a novel and improved planetary gear.

The preceding objects are accomplished by an invention which substantially comprises a driving shaft which is movably mounted in a hollow axle shaft for radial movement therein, a sun gear mounted on the driving shaft, an internal gear surrounding the sun gear, a carrier rotating about the hollow shaft, and a plurality of planet gears disposed between the sun gear and the internal gear and mounted on said carrier gear for radial movement thereon.

Figure 1:
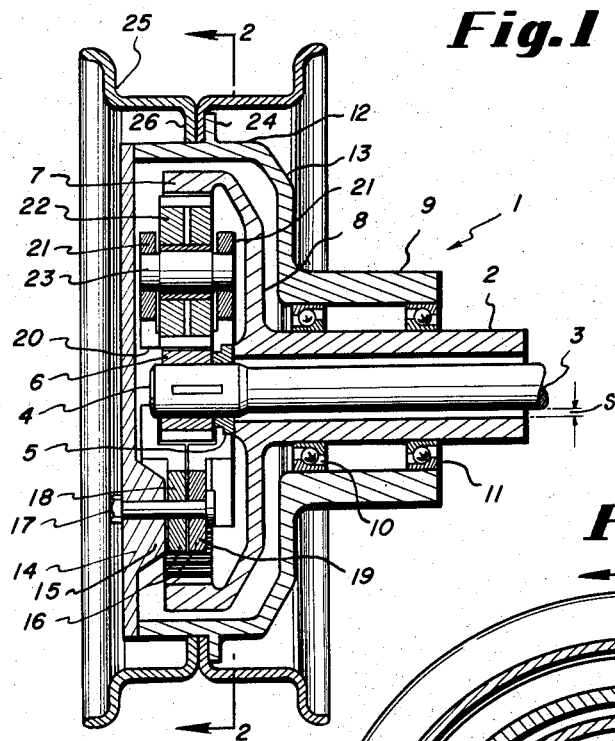
Figure 2:
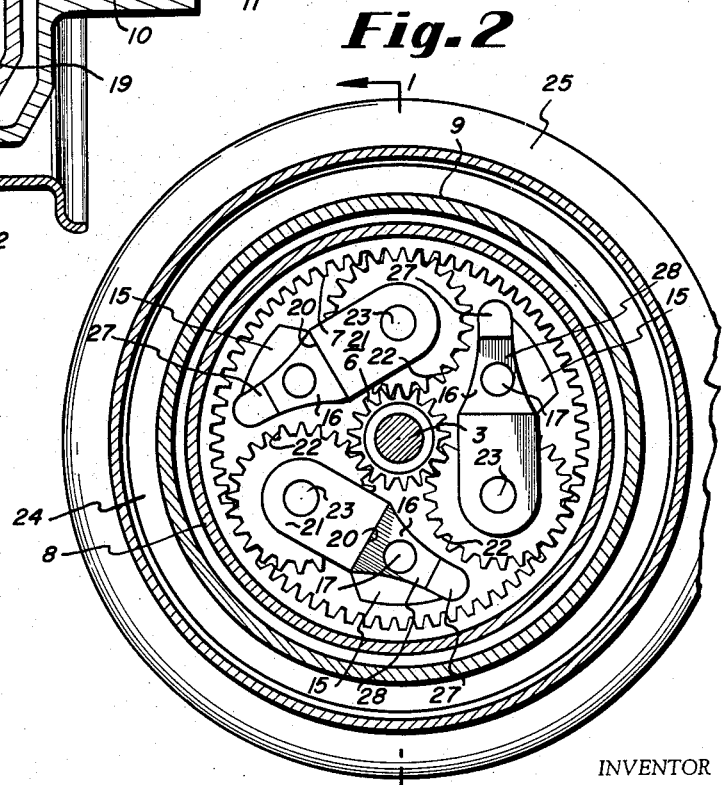

Other objects and advantages of this invention will become apparent from the accompanying description when taken in conjunction with the following drawings, wherein:

Figure 1 is a longitudinal sectional view along the axis of the planetary gear of this invention and taken along the lines 1—2 of Figure 2; and Figure 2 is a sectional view taken along the lines 2—2 of Figure 1.

Returning now to the drawings, and more particularly to Figure 1 where like reference symbols indicate the same parts throughout the various views, 1 indicates the planetary gear of this invention. The planetary gear is supported upon rigidly mounted hollow axle shaft 2 within which a drive shaft 3 is movably mounted. The drive shaft has a considerable degree of radial movement, as shown by the clearance indicated at S. One end of the drive shaft, indicated at 4, extends outwardly of the rear axle shaft. There is a collar 5 mounted on the end 4 in contact with the end of the hollow axle shaft, as may be seen in Figure 1. A sun gear 6 is secured upon the end 4 of the drive shaft adjacent the collar 5.

An internal gear 7 surrounds the sun gear 6 and is connected by disc 8 to the rear axle shaft. It is preferable that the internal gear 7 and the disc 8 be integral with the hollow axle shaft, such as illustrated in Figure 1.

A hub 9 is rotatably supported by bearings 10 and 11 upon the hollow axle shaft. A cylinder 12 is connected by a disc 13 to the hub. Again, it is preferred that the cylinder 12, disc 13 and hub 9 be a single integral unit, as illustrated in Figure 1.

A carrier 14 is mounted on the front end of the cylinder 12. There are a plurality of projections or bosses 15 on the inner face of the carrier. An arm 16 is pivotally mounted adjacent one end thereof to each of the projections 15 by a bolt 17. Each arm comprises a pair of straps 18 and 19 which are bent outwardly at right angles at 20 to form spaced offsets 21. The spaced offsets 21 are at the free end of the arms 16 and extend in the direction of rotation of the carrier. The other end of the arm 16, before the spaced offsets 21, is indicated at 28 and carries a counterweight 27 on the end thereof.

A planet gear 22 is carried on the free end of each of the arms 16. The planet gear is mounted by a pin 23 and is disposed between the sun and internal gears so as to drivingly engage both of these gears.

An external annular flange 24 is secured to the cylinder 12. A wheel rim 25 to support a vehicle wheel (not shown) is secured by a rear disc 26 to the flange 24.

The present invention is a result of investigations in planetary gears to determine structures which would give the greatest possible equalization of tooth pressure under operating conditions. Previously it was considered that by adjustably mounting only one of either the internal gear, the sun gear, or the planet gears, that the resulting movement in a radial direction would adequately equalize tooth pressure. It has been found, however, that the planetary gear will be more susceptible to self-centering if both the sun gear and the planet gears are radially movable. The equalization of the gear tooth pressure is considerably increased at high speeds because the planet gears are pushed into the teeth of the internal gear. As a result, tooth pressure equalization occurs because of the radial movable mounting of the sun gear. At lower speeds there is free motion between the planet gears and the internal gear. Under these conditions additional equalization of the tooth pressure occurs because of the radial movable quality of the planet gears.

Thus, at high speeds it is not enough that the planet gears merely be radially movable, but that they are actually urged into the teeth of the internal gear by the force exerted upon the planetary gears by the pivotally mounted arms.

Under any circumstances, i.e., both high and low speeds of the planetary gear, equalization of the tooth pressure may be further increased by compensating for the effect of the centrifugal force of the planet gears. This is achieved by extending the arms beyond the bolts 17 and mounting counterweights 27 on these extensions 28. The counterweights 28 will tend to neutralize the effect of the centrifugal force on the planet gears and will tend to minimize the tooth pressure between the planet wheels and internal gear due to centrifugal force.

Thus it can be seen that an improved planetary gear is provided wherein both the sun gear and the planet gears are radially movable with respect to each other. The movements of these two elements will considerably increase the equalization of the tooth pressure of the various gear members. As a result the planetary gear will be quieter in operation and will be longer lasting since various unbalanced pressures in the individual teeth will be eliminated. Furthermore, for the particular use of the planetary gear disclosed in this invention, namely between a driving shaft of a vehicle wheel and a vehicle wheel, forces in the gear teeth induced by road shocks acting upon the wheel will be greatly minimized because of the radial movements of both the sun gear and the planet gears.

It will be understood that this invention is susceptible to modification in order to adapt it to different usages and conditions, and, accordingly, it is desired to comprehend such modifications within this invention as may fall within the scope of the appended claims.

What is claimed is:

1. In a planetary gear driving arrangement for motor vehicles, a hollow axle shaft, a drive shaft mounted within said hollow axle shaft with there being a clearance between said drive shaft and housing for lateral movement of said drive shaft therein, a sun gear on said drive shaft, an internal gear surrounding said sun gear and attached to said hollow axle shaft, a carrier rotatably mounted on said hollow axle shaft, and a plurality of planet gears mounted for rotational movement on said carrier, the centers of said planet gears being mounted on said carrier for arcuate movement thereon, said planet gears drivingly engaging said internal gear and sun gear whereby the lateral movement of the sun gear and the arcuate movement of the centers of the planet gears equalize the pressures on the gear teeth.

2. In a planetary gear between the driving shaft of a vehicle wheel and the vehicle wheel itself, a hollow axle shaft, a drive shaft movably mounted within said axle shaft for lateral movement therein, a sun gear on said drive shaft, an internal gear surrounding said sun gear and attached to said hollow axle shaft, a carrier rotatably mounted on said hollow axle shaft, said vehicle wheel being attached to said carrier for rotation therewith, a plurality of arms pivotally mounted on said carrier, and a planet gear mounted on each of said arms for radial movement with respect to said carrier whereby the radial movements of the sun and planet gears equalize the pressure on the gear teeth.

3. In a planetary gear between the driving shaft of a vehicle wheel and the vehicle wheel itself and normally rotatable in one direction, a hollow axle shaft, a drive shaft rotatably mounted within said axle shaft for lateral movement therein, a sun gear on said drive shaft, an internal gear surrounding said sun gear and attached to said hollow axle shaft, a carrier rotatably mounted on said hollow axle shaft, said vehicle wheel being attached to said carrier for rotation therewith, a plurality of arms each having a pivotal mounting at one end thereof for mounting said arms on said carrier, the free ends of said arms extending toward the direction of movement of the pivotal mountings of said arms during the rotation of the carrier in said one direction, and a planet gear mounted on the free end of each of said arms for radial movement with respect to said carrier whereby the radial movements of the sun and planet gears equalize the pressures on the gear teeth.

4. In a planetary gear between the drive shaft of a vehicle wheel primarily for rotation in one direction and the vehicle wheel itself and normally rotatable in one direction, a hollow axle shaft, a drive shaft movably mounted within said hollow axle shaft for lateral movement therein, a sun gear on said drive shaft, an internal gear surrounding said sun gear and attached to said hollow axle shaft, a carrier rotatably mounted on said hollow axle shaft, said vehicle wheel being attached to said carrier for rotation therewith, a plurality of arms each having a pivotal mounting at one end thereof for mounting said arms on said carrier, a planet gear on the end of each of said arms which extends toward the direction of movement of the pivotal mountings of said arms during the rotation of the carrier in said one direction, and a weight on the other end of each of said arms to neutralize the effect of centrifugal force on said planet gears.

5. In a planetary gear between the drive shaft of a vehicle wheel and the vehicle wheel itself, a hollow axle shaft, a drive shaft movably mounted within said axle shaft for lateral movement therein and extending outwardly of the end of said hollow shaft, a sun gear mounted on the extended end of said drive shaft, an internal gear surrounding said sun gear and attached to said hollow axle shaft, a carrier rotatably mounted on the hollow axle shaft, and a plurality of planet gears movably mounted on said carrier to pivot in arcuate movement thereon and drivingly engaging said internal gear and said sun gear whereby the radial movements of the sun and planet gears equalize the pressures on the gear teeth.

6. In a planetary gear between the driving shaft of a vehicle wheel primarily for rotation in one direction and the vehicle wheel itself, the combination of a rigidly mounted hollow axle shaft, a drive shaft movably mounted within said axle shaft for lateral movement therein and extending outwardly of the end of said hollow shaft, a sun gear mounted on the extended end of said drive shaft, an internal gear surrounding said sun gear and attached to said hollow axle shaft, a carrier rotatably mounted on said hollow axle shaft, said vehicle wheel being attached to said carrier for rotation therewith, a plurality of arms each having a pivotal mounting at one end thereof for mounting said arms on said carrier, a planet gear on the end of each of said arms which extends towards the direction of movement of the pivotal mountings of said arms during the rotation of the carrier in said one direction, and a weight on the other end of each of said arms to neutralize the effect of centrifugal force on said planet gears.

References Cited in the file of this patent

UNITED STATES PATENTS

| | | |
|---|---|---|
| 2,460,269 | Fawick | Feb. 1, 1949 |
| 2,498,295 | Peterson et al. | Feb. 21, 1950 |
| 2,543,811 | Snow et al. | Mar. 6, 1951 |